United States Patent
Patel

[11] Patent Number: 5,869,433
[45] Date of Patent: *Feb. 9, 1999

[54] NON-FLUORESCING OIL-BASED DRILLING FLUID

[75] Inventor: Arvind D. Patel, Houston, Tex.

[73] Assignee: M-I L.L.C., Houston, Tex.

[*] Notice: This patent issued on a continued prosecution application filed under 37 CFR 1.53(d), and is subject to the twenty year patent term provisions of 35 U.S.C. 154(a)(2).

[21] Appl. No.: 520,963

[22] Filed: Aug. 30, 1995

Related U.S. Application Data

[63] Continuation-in-part of Ser. No. 279,925, Jul. 25, 1994, abandoned, which is a continuation-in-part of Ser. No. 145,806, Oct. 29, 1993, abandoned, which is a continuation-in-part of Ser. No. 4,547, Jan. 14, 1993, abandoned, which is a continuation-in-part of Ser. No. 535,110, Jun. 9, 1990, Pat. No. 5,189,012, which is a continuation-in-part of Ser. No. 503,304, Mar. 30, 1990, abandoned.

[51] Int. Cl.$^6$ .............................. C09K 7/00; C09K 7/02; C09K 7/06
[52] U.S. Cl. .................. 507/103; 507/905; 507/116; 507/118; 507/127; 507/128; 507/130; 507/131; 507/135; 507/129; 507/138; 507/139; 507/137
[58] Field of Search ..................... 507/103, 905, 507/116, 118, 127, 128, 130, 131, 135, 129, 138, 139, 137

[56] References Cited

U.S. PATENT DOCUMENTS

| | | | |
|---|---|---|---|
| 2,698,833 | 1/1955 | Wilson | 507/103 |
| 4,374,737 | 2/1983 | Larson et al. | 507/131 |
| 4,508,628 | 4/1985 | Walker et al. | 507/103 |
| 4,787,990 | 11/1988 | Boyd | 507/103 |
| 4,876,017 | 10/1989 | Trahan et al. | 507/103 |
| 5,096,883 | 3/1992 | Mercer et al. | 507/103 |
| 5,189,012 | 2/1993 | Patel et al. | 507/103 |

*Primary Examiner*—Philip Tucker
*Attorney, Agent, or Firm*—Arnold, White & Durkee

[57] ABSTRACT

The present invention relates to an oil-based drilling fluid, a continuous phase for an oil-based drilling fluid, and additives for an oil-based drilling fluid. The drilling fluid, the continuous phase of the drilling fluid, and the additives for the oil-based drilling fluid are characterized by non-fluorescence (defined as a fluorescence intensity of 800 or less) when exposed to ultraviolet light. The continuous phase of the drilling fluid is composed of synthetic hydrocarbons selected from the group consisting of oligomers synthesized from one or more alphaolefins containing a $C_2$ to $C_{14}$ chain length, wherein the oligomers have an average molecular weight of from 120 to 100, and additives. The additives of the continuous phase include surfactants, wetting agents and/or emulsifiers.

20 Claims, 2 Drawing Sheets

VERSAMUL
DILUTION FACTOR 1:400

EMCOL - 4500
DILUTION FACTOR 1:400

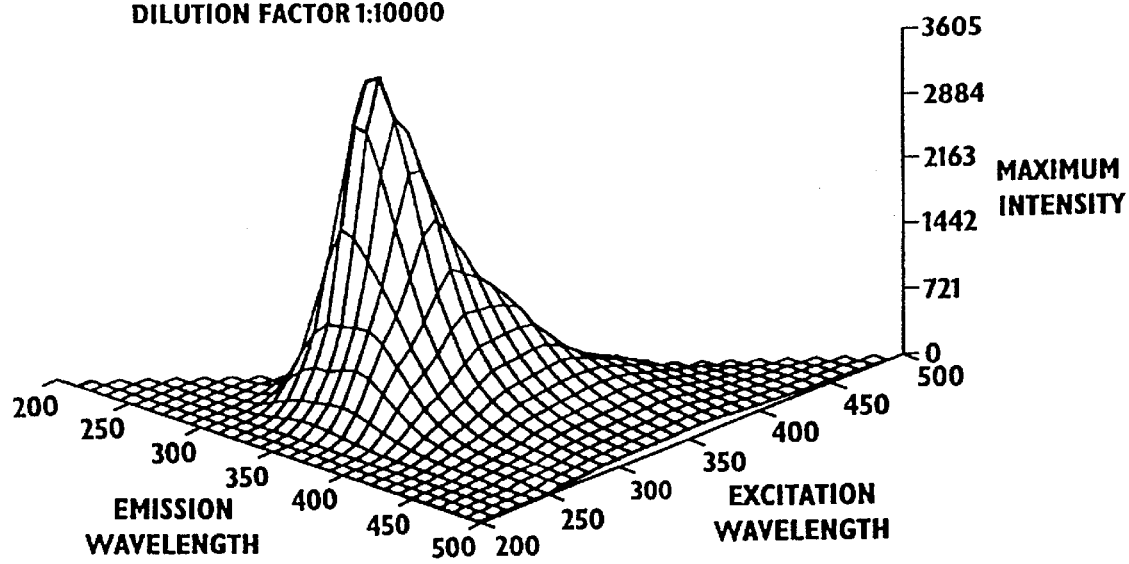

NON-FLUORESCING OIL-BASED DRILLING FLUID

CROSS-REFERENCE TO RELATED APPLICATION

This application is a continuation-in-part of commonly assigned, U.S. patent application Ser. No. 08/279,925 filed Jul. 25, 1994 now abandoned, which is a continuation-in-part of commonly assigned, U.S. patent application Ser. No. 08/145,806 filed Oct. 29, 1993 now abandoned, which is a continuation-in-part of commonly assigned, U.S. patent application Ser. No. 08/004,547 filed Jan. 14, 1993 now abandoned, which is a continuation-in-part of commonly assigned, U.S. patent application Ser. No. 535,110 filed Jun. 8, 1990 now U.S. Pat. No. 5,189,012, which is a continuation-in-part of U.S. patent application Ser. No. 503,304 filed Mar. 30, 1990, now abandoned.

BACKGROUND OF THE INVENTION

This invention relates to a non-fluorescing oil-based drilling fluid used in the drilling of subterranean oil and gas wells as well as other drilling fluid applications and drilling procedures. These non-fluorescing drilling fluids are composed of synthetic hydrocarbons, having molecular weights of from 120 to 1000, derived from alphaolefinic monomers and other additives such as surfactants and emulsifiers. The olefinic monomers are from the groups consisting of a carbon chain from $C_2$ to $C_{14}$ having at least one polymerizible double bond. The surfactants comprise monounsaturated fatty acids and saturated fatty acids. The emulsifiers comprise saturated fatty acids, saturated amido-amines, and saturated sulfonates. Additional materials that are common to the development and formulation of drilling fluids may also be included in the instant drilling fluids provided that the additional materials do not fluoresce in the presence of ultraviolet light. For purposes of this patent application the terms "fluoresce" or "fluorescence" will be understood to refer to a fluorescence intensity of greater than 800 when the fluid being measured is diluted with hexane at a ratio of 1 to 400.

In rotary drilling there are a variety of functions and characteristics that are expected of a drilling fluid ("drilling mud" or simply "mud"). The drilling fluid is expected to carry cuttings from beneath the bit, transport them up the annulus, and permit their separation at the surface while at the same time the rotary bit is cooled and cleaned. A drilling mud is also intended to reduce friction between the drill string and the sides of the hole while maintaining the stability of uncased sections of the borehole. Likewise the drilling fluid is formulated to prevent unwanted influxes of formation fluids from permeable rocks penetrated and likewise to form a thin, low permeability filter cake which seals pores and other openings and formations penetrated by the bit. Finally, the drilling fluid is used to collect and interpret information available from drill cuttings, cores and electrical logs.

Various advantages of using oil-based drilling mud in the rotary drilling of boreholes in the earth have been known for some time. In summary, it can be said that under certain conditions, one or more of the following advantages make oil-based muds more desirable than water-based muds. Lubricity characteristics are excellent. Drilling fluid weighing less than about 8 pounds per gallon can be prepared with an oil-based mud, and have proved advantageous in certain special drilling and coring situations. The penetration of the formation by water is avoided. Cores can be recovered in an in situ condition in the presence of hydrous clays and bentonites; no swelling or sloughing is experienced to reduce porosities or cause pipe sticking difficulties. There are fewer problems with hydrophilic shale formations drilled. Evaporite sections such as salt zones can be drilled with minimal leaching of the salt. Furthermore, oil-based muds can be formulated to withstand temperatures up to 500 degrees Fahrenheit.

On both offshore and inland drilling barges and rigs, drill cuttings are conveyed up the hole by a drilling fluid. With an oil-based drilling fluid, the cuttings, besides ordinarily containing moisture, are necessarily coated with an adherent film or layer of oily drilling fluid which may penetrate into the interior of each cutting. This is true despite the use of various vibrating screens, mechanical separation devices, and various chemical and washing techniques.

Mud logging is a process which involves the recording of information derived from the examination and analysis of formation cuttings. A portion of the drilling fluid is diverted through a gas-detecting device and examined under ultraviolet light to detect the presence of oil or gas. If the drilling fluid fluoresces this indicates that hydrocarbons are present and that the desired formation has been reached.

Unfortunately, in most oil-based drilling fluids either the oil used in the fluid or the surfactants that are present naturally fluoresce. This interferes with the results of the mud log because the mud logger cannot accurately ascertain whether formation hydrocarbons are present. This problem has hampered the use of fluoroscopy to determine the presence of hydrocarbon formations when either oil-based or oil-emulsion muds are used.

Graham et al., U.S. Pat. No. 2,951,940, disclose a method of detecting the presence of crude oil in the earth's strata. This method entails contacting the surface of a rock chip that has been carried to the earth's surface by a drilling mud with a reverse-wetting agent. The rock chip is then contacted with ultraviolet light. By comparing the relative fluorescence of the surface of the chip before and after the contacting operation, a positive indication of the presence of the hydrocarbons may be obtained.

U.S. Pat. No. 3,050,141 discloses a drilling fluid emulsion which comprises an oil- and water-insoluble and immiscible liquid. This liquid is characterized by the fact that it either fails to fluoresce in the presence of ultraviolet light or it fluoresces a different color from typical unrefined hydrocarbons or crude oils. This liquid forms a third layer in the presence of oil and water because it is incompatible with both oil and water.

Boyd, U.S. Pat. No. 4,787,990 discloses a non-fluorescent oil-based drilling fluid which consists essentially of branched- and cyclic-paraffins having 11 to 17 carbon atoms per molecule and further having a low aromatic content of less than about 1% and a low normal-paraffin content of less than about 5%.

Mercer et al, U.S. Pat. No. 5,096,883 teaches a hydrogenated synthetic polyalphaolefin having utility as a drilling fluid. The Mercer reference teaches various primary and secondary emulsifiers as useful for oil-based fluids. The primary emulsifiers taught by Mercer include fatty acid mixtures and modified sodium salts of higher organic acids. Secondary emulsifiers taught by Mercer include materials such as polyamides. The use of either a primary or secondary emulsifier as taught by Mercer, or a combination of primary and secondary emulsifiers, will inherently result in fluorescence characteristics greater than those permissible in the practice of this invention. In Example 1 of the Mercer patent Invermul NT (Baroid) is used as a primary emulsifier and EZ-Mul NT (Baroid) is used as a secondary emulsifier. Invermul NT is chemically equivalent to VERSAWET (M-I Drilling Fluids) and EZ-Mul NT is chemically equivalent to VERSACOAT (M-I Drilling Fluids). Referring to Table 8 of this application verifies that both VERSAWET and VERSACOAT and therefore Invermul NT and EZ-Mul NT, respectively, have fluorescence characteristics outside the scope of this invention, e.g., greater than 800. Likewise in Example 2 of the Mercer patent TRUMUL (International Drilling Fluids) and TRUPERSE (International Drilling Fluids) are identified as an emulsifier and wetting agent respectively. These materials are chemically equivalent to VERSACOAT and VERSAWET, respectively, and therefore are known to exceed the fluorescent intensity limits of this invention. Independent testing with TRUMUL (International Drilling Fluids) and TRUPERSE (International Drilling Fluids) have confirmed the fluorescent characteristics of these materials.

As can be seen from the above, the development of a drilling fluid that exhibits the desirable characteristics of an oil-based fluid and fails to fluoresce in the presence of UV light has long been an unachieved goal of the oil and gas exploration industry. With the practice of applicant's invention this goal has been realized.

SUMMARY OF THE INVENTION

This invention relates to a non-fluorescing (defined as a fluorescence intensity of 800 or below) oil-based drilling fluid. The drilling fluid is composed of synthetic hydrocarbons that have been synthesized from one or more alpha-olefinic monomers having a chain length of $C_2$ to $C_{14}$. The hydrocarbons have an average molecular weight of from about 120 to about 1000. The drilling fluid also includes surfactants and/or emulsifiers which are saturated, monounsaturated, and/or non-conjugated unsaturated. The drilling fluid is characterized by the fact that it fails to fluoresce in the presence of ultraviolet light.

There is no art-accepted definition of non-fluorescence, as virtually all organic molecules will fluoresce to some extent given some excitation source. Typically, oil-based drilling fluids have a natural degree of fluorescence. However, the fluorescent characteristics of the drilling fluids of this invention are below the levels typically encountered or detectable in crude oil and therefore do not confuse the fluorescence measurement methods and apparatus. Therefore, as mentioned hereinabove a level of 800 or below shall be understood to refer to a non-fluorescent material.

For purposes of this application fluorescence is measured in units of fluorescence intensity. Fluorescence intensity is obtained using wavelength emersion and wavelength excitation readings as shown in FIGS. 1–3. Fluorescence intensity is an arbitrary number developed based on absorption of light energy by a test tube size sample of a test fluid. Fluorescence intensity is expressed as a numerical representation of the maximum emission/excitation at any wavelength between 200 to 500 wavelength (measured in nanometers). For purposes of this application the total scanning methodology have been employed to determine the fluorescent intensity of samples over a wide range of wavelengths.

A total scanning fluorescence system has several advantages over simpler scanning methods: (1) the acquisition of multiple fluorescence spectra is faster; (2) the amount of fluorescence data per sample is greatly increased; (3) the stored data can be extensively manipulated by computer; and (4) individual excitation spectrum can be retrieved from the total fluorescence spectrum and analyzed for the intensity and wavelength of maximum excitation and/or emission fluorescence. Viewing the total fluorescence spectrum, using a three-dimensional or contour presentation is a powerful and useful "fingerprinting" tool.

The fluorescence intensity was measured using a Perkin-Elmer (PE) 650-40 fluorescence spectrometer. Additional information concerning this machine may be found in the article by J. M. Brooks et al. entitled "Applications of Total Scanning Fluorescence to Exploration Geochemistry," 15th Annual Offshore Technology Conference, Houston, Texas, May 2–5, 1983, pp. 393–396, OTC 4624, which is hereby incorporated by reference.

The synthetic hydrocarbon oils of this invention are manufactured by oligomerizing alpha-olefins or other olefins to form polyalphaolefins, linear alphaolefins, and internal alphaolefins. The resulting oils are mixtures of hydrocarbon molecules with carbon numbers that are even multiples of the base olefin. For instance, a synthetic hydrocarbon oil made from $C_8$ olefins contains only molecules that are $C_8$, $C_{16}$, $C_{24}$, $C_{32}$, etc. These oils can be hydrogenated to achieve complete saturation, or partially hydrogenated, or left unhydrogenated. Preferably they contain no aromatics or other conjugated olefin double bonds. Because these oils are synthetic, their molecular size and structure, and their performance characteristics, can be controlled in a predictable and understandable manner. In the preferred embodiment of this invention the synthetic hydrocarbon oils used are characterized by the absence or substantial absence of conjugated double bonds. The presence of conjugated double bonds has proven to be a significant factor in causing materials to fluoresce.

The term "surfactant" as used in this application should be understood to include emulsifiers. The terms "surfactant" and "emulsifier" are used interchangeably. The surfactants of the instant invention are fatty acids with one or less points of unsaturation which do not fluoresce in presence of ultraviolet light. Preferred surfactants are distilled tall oil fatty acids, oleic acid, and isostearic acid wherein the distillation or purification process have removed the fluorescing components. Tall oil and stearic acid as referenced in the Mercer patent, U.S. Pat. No. 5,096,883 would inherently fluoresce in the absence of purification procedures. In the preferred embodiment of this invention, the base materials used to synthesize the surfactant or emulsifier are characterized by the absence or substantial absence of conjugated double bonds. The presence of conjugated double bonds has proven to be a significant factor in causing surfactants or emulsifiers to fluoresce.

In certain instances the base materials used to formulate the components of this invention are available in a range of commercial purity levels. In certain instances, some of the impurities, e.g., aromatics or conjugated double bonds, may inherently result in level of fluorescence that is unacceptable for use in the method or product of this invention. In such instances, only the materials of a sufficient purity to be classified as non-fluorescent pursuant to the definition in this application are intended to be included. As a specific example, oleic acid is often used as an emulsifier or as a component of an emulsifier in drilling fluids. To the extent that oleic acid is commercially available in forms that would impart fluorescence to a drilling fluid, then such materials are not included within the scope of this invention. However, the same general chemicals, e.g., oleic acid, may be available in pure forms that are not fluorescent and therefore are included within the scope of this invention. In certain other instances, a raw material such as oleic acid, which may contain aromatics or conjugated double bonds or other impurities so that fluorescence is imparted, can be purified by removing some or all of the impurities to make the material appropriate for inclusion in the product of this invention.

The non-fluorescing emulsifiers of the instant invention are derived from non-conjugated, monounsaturated or saturated fatty acids, such emulsifiers include amido-amines and sulfonates. Preferred emulsifiers are sorbitan mono- and di-oleates (Arlacel 186 obtained from ICI, Ltd.), amido-amines (Miranol-CS; Rhône-Poulenc), and sulfosuccinates (Emcol-4500; Witco Chemical). As described above, in the preferred embodiment of this invention, the base materials used to synthesize the non-fluorescing emulsifiers of this invention are characterized by the absence or substantial absence of conjugated double bonds.

In the case of both of the emulsifiers and the surfactants used in the process and product of this invention, the fluorescing materials, e.g. conjugated double bonds, have been carefully removed from the materials prior to being used in the drilling fluid of this invention. In other instances, the base materials are synthesized without permitting the formation of conjugated double bonds (see Example).

The drilling fluid may also include other materials common to the development and formulation of drilling fluids provided that the additional materials do not fluoresce in the presence of ultraviolet light. This allows the drilling fluid to be altered to fit specific well conditions. The only requirement is that the drilling fluid must remain non-fluorescent.

DESCRIPTION OF THE FIGURES

FIG. 3 is a three-dimensional representation of the fluorescence characteristics of a California oil as it is removed from the ground. This oil contains aromatic compounds with conjugated double bonds. This figure was produced by plotting the emission wavelength (x-axis), the excitation wavelength (y-axis), and the maximum intensity (z-axis). The data used to generate this figure may be found in Table 5A.

DESCRIPTION OF THE PREFERRED EMBODIMENT

Figure 1:
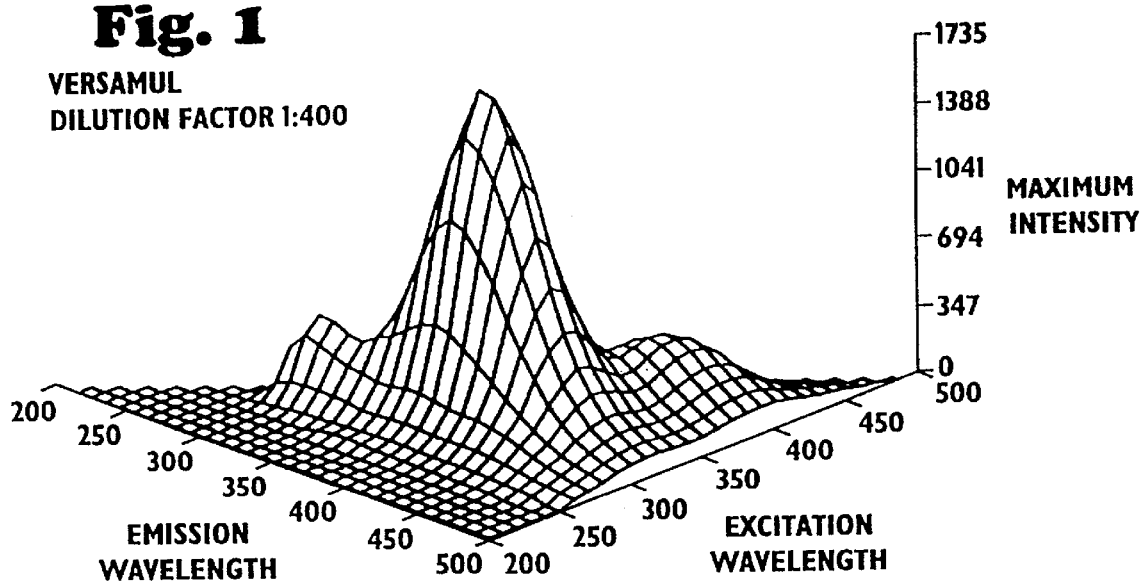
FIG. 1 is a three-dimensional representation of an emulsifier that fluoresces in the presence of ultraviolet light. The emulsifier that was utilized in FIG. 1 in the oil-based mud is Versamul and it is produced and distributed by M-I Drilling Fluids Co. This emulsifier is identical to the Kenol-ES emulsifier utilized by Boyd et al. in U.S. Pat. No. 4,787,990, column 5, lines 1–15. The sample was diluted to 1:400 prior to testing. This figure was produced by plotting the emission wavelength (x-axis), the excitation wavelength (y-axis) and the maximum intensity (z-axis). The data used to generate this figure may be found in Table 6.

This invention relates to a non-fluorescing oil-based drilling fluid. For the purposes of this invention, non-fluorescing shall mean that a substance does not fluoresce under ultraviolet light to an extent that is discernable by the naked eye. More particularly the substance will exhibit a fluorescence intensity of 0 to 800 when diluted 1 to 400 with hexane. Preferably the substance will exhibit a fluorescence intensity of 0 to 500. This last range of fluorescence is so slight as to be discernable only through the aid of a machine. The following machines may be used to determine the fluorescence intensity of a substance:

(1) The Perkin-Elmer (PE) 650-40 fluorescence spectrometer with "SCANR" software programs;

(2) Oil fluoroscope model 2014 by Alkco services; and (3) Mineral light UVS-54 by San Gabriel Products Inc..

Additional information concerning the Perkin-Elmer (PE) 650-40 fluorescence spectrometer may be found in the article by J. M. Brooks et al. entitled "Applications of Total Scanning Fluorescence to Exploration Geochemistry." For purposes of this application, the term "non-fluorescence" will be understood to refer to a fluorescence intensity of 800 or less under ultraviolet light when diluted with hexane at a ratio of 1 to 400.

The drilling fluid is composed of synthetic hydrocarbons that have been synthesized from one or more alphaolefinic monomers having a chain length of $C_2$ to $C_{14}$. The hydrocarbons have an average molecular weight of from about 120 to about 1000 and are saturated, monosaturated and/or non-conjugated unsaturated. The drilling fluid also includes non-fluorescing surfactants and/or emulsifiers. The drilling fluid is characterized by the fact that it fails to fluoresce in the presence of ultraviolet light because the fluorescing components are removed before they are used or the components are synthesized from non-conjugated base materials.

The following table indicates the preferred olefinic compounds from which the chain oligomeric and polymeric synthetic hydrocarbon can be manufactured.

| Carbon Atoms | Compound |
| --- | --- |
| $C_2$ | Ethylene |
| $C_3$ | Propene |
| $C_4$ | Butene-1, Isobutene |
| $C_5$ | Pentene |
| $C_6$ | Hexene |
| $C_7$ | Heptene |
| $C_8$ | Octene |
| $C_9$ | Nonene |
| $C_{10}$ | Decene |
| $C_{12}$ | Dodecene |
| $C_{13}$ | Tridecene |
| $C_{14}$ | Tetradecene |

Various synthetic hydrocarbons are commercially available to be used in the present invention. For example, polypropenes from AMOCO Chemical Company, product numbers #9009 and 9011; Chevron Chemical Company's product identified as Polymer-560; polybutenes Indopol L-14 and H-15 offered by AMOCO Chemical Company; as well as dimeric, trimeric and tetrameric 1-decenes from Emery, Ethyl and Chevron Corporations are suitable for the present invention. These synthetic hydrocarbons can also be blended to achieve the desired chemical characteristics, which are determined according to the end use of the product.

As identified hereinbefore, the synthetic hydrocarbons that are believed to be useful in the practice of this invention are characterized by chain length, molecular weight, and conjugation parameters. Useful synthetic hydrocarbons are oligomers synthesized from one or more alphaolefins containing a $C_2$ to $C_{14}$ chain length and wherein the oligomers have an average molecular weight of from 120 to 1000. In the preferred embodiments of this invention the synthetic hydrocarbons are oligomers synthesized from one or more alphaolefins containing a $C_3$ to $C_{12}$ chain length and wherein the oligomers have an average molecular weight of from 160 to 800. In the most preferred embodiments of this invention the synthetic hydrocarbons are oligomers synthesized from one or more alphaolefins containing a $C_4$ to $C_{14}$ chain length and wherein the oligomers have an average molecular weight of 200 to 600. In the synthesis of the preferred, and most preferred embodiments of this invention, the synthetic hydrocarbons and the remaining additives to the drilling fluid are characterized as non-conjugated hydrocarbons.

In each instance the synthetic hydrocarbon mixture must have performance and viscosity characteristics that permit functional utility as a drilling fluid. In its broadest form the synthetic hydrocarbon mixture should have a viscosity of from 1.0 to 6.0 centistokes, preferable a viscosity of from 1.5 to 4.0 centistokes and most preferably from 1.5 to 3.5 centistokes. The synthetic hydrocarbons of the present invention may be hydrogenated (saturated), partially hydrogenated or non-hydrogenated. However, it is essential that the synthetic hydrocarbon be non-conjugated, either by derivation from non-conjugated base materials or removal of conjugation after synthesis.

The interfacial tension between oil and water is very high, so if the liquids are mixed together they mechanically separate immediately when the agitation ceases, to minimize the interfacial area. Lowering the interfacial tension with a surfactant enables one liquid to form a stable dispersion of fine droplets in the other. The lower the interfacial tension, the smaller the droplets and the more stable the emulsion. In most emulsions, oil is the dispersed phase and water is the continuous phase. However, in "invert emulsions" in which water is the dispersed phase, a suitable emulsion can be formed upon the use of a suitable emulsifier.

Whether an oil-in-water or water-in-oil emulsion is formed depends on the relative solubility of the emulsifier in the two phases. Thus, a preferentially water soluble surfactant, such as sodium oleate, will form an oil-in-water emulsion because it lowers the surface tension on the water side of the oil-water interface, and the interface curves toward the side with the greater surface tension, thereby forming an oil droplet enclosed by water. On the other hand, calcium and magnesium oleates are soluble in oil, but not in water, and thus form water-in-oil emulsions.

An invert water-in-oil emulsion has oil as the continuous phase. The compositions of this invention may comprise 100% oil by volume of the total composition. Water, usually in the form of brine, is normally added in these compositions. Water may be added to the drilling fluid up to a volume of 70%. In more preferred embodiments water is added from 5% to 65% by volume, and in the most preferred embodiment water is added from 10% to 60% by volume. These brines contain salts such as NaCl and/or $CaCl_2$ in varying amounts.

The compositions of one embodiment of this invention require emulsifiers to incorporate the brine or water phase into the synthetic hydrocarbon continuous phase. The emulsifiers are chemical compounds which have both oleophilic and hydrophilic parts. The emulsifiers that have demonstrated utility in the emulsions of this invention are saturated, monounsaturated, or non-conjugated unsaturated fatty acids, and amido-amines, and sulfonates derived from these fatty acids, and combinations of the above. Blends of these materials as well as other emulsifiers can be used for this application provided that the emulsifiers fail to fluoresce in the presence of ultraviolet light. Preferred emulsifiers are oleic acid, isostearic acid, sorbitan monoleate, Miranol-CS, amido-amines, and sulfosuccinates. These emulsifiers are manufactured and distributed by Emery, ICI, Witco, Rhône-Poulenc and M-I Drilling Fluids. It is essential that the emulsifiers and base materials used to synthesize the emulsifiers of this invention be non-conjugated.

Surfactants may also be used in the drilling fluids of this invention. The surfactants that have demonstrated utility in the emulsions of this invention are saturated fatty acids and monounsaturated fatty acids and combinations of the above. Blends of these materials as well as other surfactants may also be utilized provided that the surfactants do not fluoresce when contacted with ultraviolet light. Preferred surfactants are isostearic acid, oleic acid and Acintol-EPG. These surfactants are manufactured and distributed by the Emery Chemical Co. and the Arizona Chemical Co. As with the emulsifiers of this invention, it is likewise essential that the surfactants, and the base materials used to synthesize the surfactants of this invention, be non-conjugated.

The oil-based drilling fluid compositions of this invention may contain an additional chemical known as a wetting agent. Various wetting agents are available and can be included in the compositions. The wetting agents included, but not limited to the present invention, are oxidized fatty acids, saturated fatty acid-based imidazolines. Preferred wetting agents are saturated fatty acid-based imidazolines. Blends of these materials as well as other wetting agents can be used for this application provided that the wetting agents fail to fluoresce in the presence of ultraviolet light.

Organophilic clays, normally amine treated clays, are also used as viscosifiers in the oil-based drilling fluid composition of the present invention. Other viscosifiers, such as oil soluble polymers, polyamide resins, polycarboxylic acids and soaps, can also be used provided the materials are non-fluorescing. The amount of viscosifier used in the composition can vary depending upon the end use of the composition. However, normally about 0.1% to 10% by weight range are sufficient for most applications. VG-69 is an organoclay material distributed by M-I Drilling Fluids Company.

The drilling fluid composition of this invention may optionally contain a weight material. The quantity depends upon the desired density and viscosity of the final composition. The preferred weight materials include, but are not limited to, barite, iron oxide, calcium carbonate and the like. The weight material is typically added to result in a drilling fluid density of up to 24 pounds per gallon, preferably up to 18 pounds per gallon and most preferably up to 16.5 pounds per gallon.

Finally, fluid loss control agents, such as modified lignite and oil soluble or oil dispersible polymers, can be added to the drilling fluid system of this invention.

The drilling fluid may also include other materials common to the development and formulation of drilling fluids provided that the additional materials do not fluoresce in the presence of ultraviolet light. This allows the drilling fluid to be altered to fit specific well conditions. The only requirement is that the drilling fluid must remain non-fluorescent.

EXAMPLES

Synthesis of Amido-amine 1

96.65 grams of isostearic acid (Emery 871) was added to 20.29 grams of diethylenetriamine in a mechanically stirred three-neck flask. The reaction mixture was heated slowly under nitrogen atmosphere to 450° F. The water formed was distilled off. After two hours at 450° F. the reaction mixture was cooled to 350° F. and 13 grams of succinic acid was added. The reaction was heated to 390° F. for 30 minutes. The reaction was cooled to 250° F. and 37.4 grams of Ethylflow-162 polyalphaolefin was added. The reaction was cooled to 100° F. and 13.47 grams of methanol was added to the mixture. The resulting product was amido-amine-1.

Synthesis of Amido-amine-2

In a three-neck flask with a mechanical stirrer, 132 grams of isostearic acid was added to 47.67 grams of diethylenetriamine. The reaction mixture was slowly heated to 450° F. and the water from the condensation reaction was distilled off. The reaction was kept under nitrogen atmosphere at all times. After 2 hours at 450° F. the reaction was cooled to room temperature. The resulting product was amido-amine-2.

The following are examples of drilling fluid compositions utilizing the products of this invention. Where known, the chemical name of each material used is supplied the first time the trade name is used.

Synthetic polyalphaolefin Ethylflow-162 was utilized to prepare 14 pounds per gallon ("ppg"), 80:20 oil:water ratio oil-based mud. Formulation 1 included Versacoat and Versawet products which fluoresce in the presence of ultraviolet light, while Formulation 2 included products of this invention. Formulation 2 did not fluoresce in the presence of ultraviolet light.

| Formulation 1 (control) | | Formulation 2 | |
|---|---|---|---|
| 158.000 g | Ethylflow-162 | 158.0 g | Ethylflow-162 |
| 49.37 g | water | 49.37 g | water |
| 17.89 g | calcium chloride | 17.89 g | calcium chloride |
| 7.5 g | Versawet (imidazoline) | 7.5 g | Emery 871 (isostearic acid) |
| 5.0 g | Versacoat (amido-amine) | 4.9 g | Miranol-CS (amido-amine) |
| 2.0 g | lime | 2.0 g | lime |
| 2.0 g | VG-69 (organophilic clay) | 2.0 g | VG-69 (organophilic clay) |
| 3.0 g | Versamod (dimer acid) | 3.0 g | Emersol 1004 (hydrogenated dimer acid) |
| 327.0 g | Barite | 327.0 g | Barite |

Table 1 summarizes the rheological properties of the above formulations on initial mixing and the after heating at 250° F. for 16 hours. These properties were measured at room temperature.

TABLE 1

| | Formulation 1 RPM Reading | | Formulation 2 | |
|---|---|---|---|---|
| RPM | Initial | Aged | Initial | Aged |
| 600 | 150 | 125 | 140 | 150 |
| 300 | 82 | 65 | 80 | 89 |
| 200 | 59 | 45 | 55 | 68 |
| 100 | 33 | 25 | 30 | 42 |
| 6 | 8 | 3 | 7 | 14 |
| 3 | 6 | 2 | 5 | 12 |
| PV/YP | 68/14 | 60/5 | 60/20 | 61/28 |
| gel strength | 8/13 | 3/6 | 7/13 | 13/20 |
| emulsion stability | 841 | 1102 | 490 | 1047 |

Formulation 3

A 12 ppg non-fluorescent oil-based mud was prepared using Mobil Chemical Co. unhydrogenated polyalphaolefin MCP-1060 and the surfactants of this invention.

| 171.0 g | MCP-1060 (unhydrogenated polyalphaolefin) |
|---|---|
| 55.6 g | water |
| 19.6 g | calcium chloride |
| 7.0 g | isostearic acid |
| 2.0 g | Emersol-1004 |
| 2.0 g | VG-69 |
| 2.0 g | lime |
| 2.0 g | Miranol-CS |
| 229.0 g | Barite |

Rheologies were taken on initial mixing and after heat aging at 250° F. and 300° F. for 16 hours and are reported in Table 2.

TABLE 2

| RPM | Initial | 250° F./16 hours | 300° F./16 hours |
|---|---|---|---|
| 600 | 123 | 127 | 108 |
| 300 | 71 | 65 | 57 |
| 200 | 52 | 45 | 40 |
| 100 | 28 | 25 | 24 |
| 6 | 5 | 5 | 4 |
| 3 | 4 | 3 | 3 |
| PV/YP | 52/19 | 62/3 | 51/6 |
| gel strength | 5/11 | 5/9 | 5/9 |
| emulsion stability | 350 | 300 | 300 |

Formulations 4 and 5

14 ppg 80:20 oil/water ratio non-fluorescent oil-based muds were prepared using Mobil Chemical Co. MCP-1038 polyalphaolefin and the emulsifiers of this invention.

| Formulation 4 | | Formulation 5 | |
|---|---|---|---|
| 156.22 g | MCP-1038 (unhydrogenated polyalphaolefin) | 156.22 g | MCP-1038 |
| 47.78 g | water | 47.78 g | water |
| 17.31 g | calcium chloride | 17.31 g | calcium chloride |
| 5.0 g | amido-amine-1* | 5.0 g | amido-amine-1* |
| 4.0 g | Acintol-EPG (distilled tall oil) | — | Acintol-EPG |
| — | amido-amine-2* | 4.0 g | amido-amine-2* |
| 6.0 g | lime | 6.0 g | lime |
| 0.75 g | Versa SWA (phosphated imidazoline) | 0.75 g | Versa SWA |
| 2.0 g | VG-69 | 2.0 g | VG-69 |
| 342.0 g | Barite | 342.0 g | Barite |

*Amido-amine-1 and amido-amine-2 were synthesized from non-fluorescing saturated fatty acids according to the procedures described previously.

The rheological properties of these mud formulations were taken initially and after heat aging at 300° F. for 16 hours as recorded in Table 3.

TABLE 3

| RPM | Formulation 4 | | Formulation 5 | |
|---|---|---|---|---|
| | Initial | Heat Aged | Initial | Heat Aged |
| 600 | 118 | 102 | 84 | 106 |
| 300 | 69 | 67 | 43 | 59 |
| 200 | 55 | 41 | 28 | 41 |
| 100 | 33 | 24 | 15 | 24 |
| 6 | 10 | 3 | 2 | 3 |
| 3 | 9 | 3 | 1 | 3 |
| PV/YP | 49/20 | 35/22 | 41/2 | 47/12 |
| gel strength | 10/20 | 5/6 | 2/4 | 4/5 |
| emulsion stability | 390 | 400 | 380 | 290 |

The following 16 ppg oil-based mud formulations were prepared using Ethylflow-162 polyalphaolefin and the surfactants of this invention. Formulations 6, 7 and 8 are detailed in Table 4 and the rheological properties of each recorded in Table 5.

TABLE 4

| | Formulation 6 | Formulation 7 | Formulation 8 |
|---|---|---|---|
| Ethylflow-162 | 146 cc | 146 cc | 146 cc |
| water | 44.5 g | 44.5 g | 44.5 g |
| calcium chloride | 16.14 g | 16.14 g | 16.14 g |
| Acintol-EPG | 7.5 g | 7.5 g | 7.5 g |
| Emcol-4500 (alkyl sulfosuccinate) | 0 | 0 | 3.0 g |
| Miranol-CS | 2.0 g | 0 | 0 |
| Arlacel-186 (sorbitan mono- and di-oleate) | 0 | 2.0 g | 0 |
| lime | 2.0 g | 2.0 g | 2.0 g |
| VG-69 | 2.0 g | 2.0 g | 2.0 g |
| Barite | 463 g | 463 g | 463 g |

TABLE 5

| RPM | Formulation 6 | | Formulation 7 | | Formulation 8 | |
|---|---|---|---|---|---|---|
| | Initial | Aged | Initial | Aged | Initial | Aged |
| 600 | 149 | 194 | 174 | 191 | 176 | 205 |
| 300 | 86 | 114 | 104 | 111 | 101 | 126 |
| 200 | 63 | 82 | 80 | 83 | 71 | 96 |
| 100 | 38 | 49 | 50 | 53 | 42 | 61 |
| 6 | 11 | 9 | 15 | 19 | 7 | 15 |
| 3 | 10 | 9 | 12 | 17 | 6 | 13 |
| PV/YP | 63/23 | 80/34 | 70/34 | 80/31 | 75/26 | 79/47 |
| gel strength | 10/15 | 10/15 | 12/18 | 18/30 | 7/12 | 17/30 |
| emulsion stability | 750 | 852 | 638 | 1225 | 621 | 795 |

Figure 2:
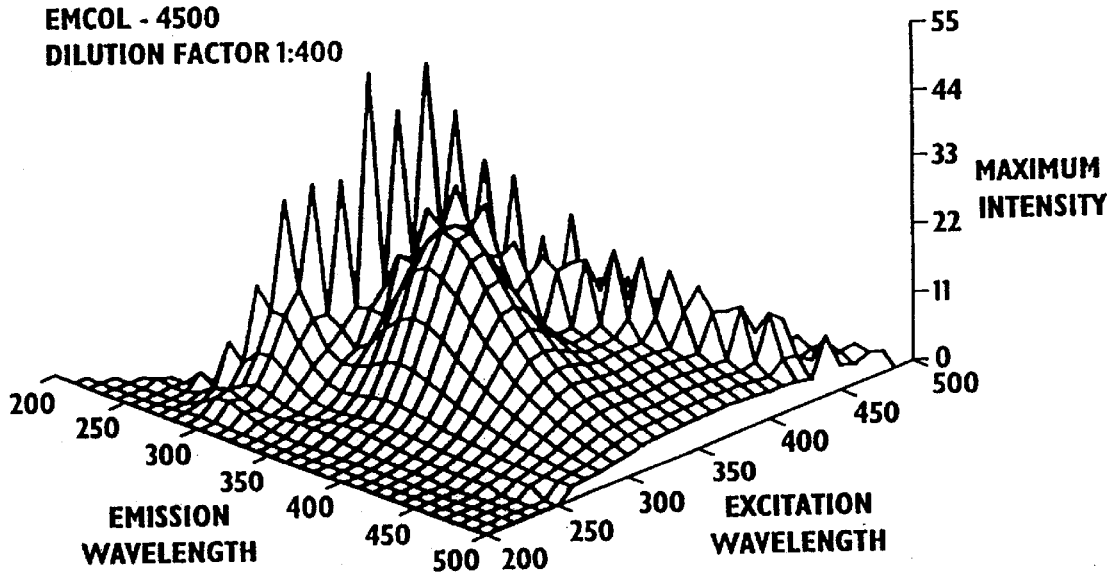
FIG. 2 is a three-dimensional representation of an emulsifier that does not fluoresce in the presence of ultraviolet light. The emulsifier that was utilized is sold under the brand name Emcol-4500 distributed by Witco Chemical Co. The sample was diluted 1:400 prior to testing. This figure was produced by plotting the emission wavelength (x-axis), the excitation wavelength (y-axis), and the maximum intensity (z-axis). The data used to generate this figure may be found in Table 7. The fluorescence intensity was measured using a Perlin-Elmer (PE) 650-40 fluorescence spectrometer.

Table 5A represents the fluorescence of a California oil as it is removed from the ground. This oil sample contains conjugated double bond systems which have fluorescence characteristics. In accordance with this invention, it is important that the oil itself, as demonstrated in Table 5A, have fluorescence characteristics that are different from those of the drilling mud used. Specifically, in accordance with the practice of this invention, it is important that the maximum intensity is 800 or less for the drilling mud used. Thus, as would be anticipated, the maximum intensity is well above 800 for most of the wavelengths shown for the California oil diluted with hexane by a ratio of 1 to 10,000. The cuttings containing the oil were collected on Mar. 24, 1992. Table 7, on the other hand, demonstrates the fluorescence characteristics of a drilling fluid sample using Emcol-4500 as the primary drilling fluid component. It can be seen that at all wavelengths tested, the maximum intensity is well beneath the 800 number required to characterize the material as fluorescent. The fluorescence values of the materials used in Tables 6 and 7 are demonstrated graphically by FIGS. 1 and 2, respectively.

TABLE 5A

California Oil
Dilution factor 1:10000

| Emission Wavelength | Excitations Wavelength | Maximum Intensity |
|---|---|---|
| 320 | 290 | 2520 |
| 340 | 290 | 3600 |
| 360 | 290 | 2610 |
| 380 | 300 | 1560 |
| 400 | 330 | 824 |
| 420 | 340 | 504 |

TABLE 6

Versamul
Dilution factor 1:400

| Emission Wavelength | Excitations Wavelength | Maximum Intensity |
|---|---|---|
| 320 | 280 | 383 |
| 340 | 290 | 486 |
| 360 | 310 | 1110 |
| 380 | 310 | 1730 |
| 400 | 310 | 1540 |
| 420 | 310 | 1060 |

TABLE 7

Emcol-4500
Dilution factor 1:400

| Emission Wavelength | Excitations Wavelength | Maximum Intensity |
|---|---|---|
| 320 | 300 | 50 |
| 340 | 320 | 52 |
| 360 | 340 | 36 |
| 380 | 310 | 28 |
| 400 | 310 | 22 |
| 420 | 370 | 24 |

Table 8 shows the total scanning fluorescent of a variety of materials evaluated for use in the process and product of this invention. In the table, the maximum intensity is 3830 for Versacoat at excitation wavelength 320 nm. and the emission wavelength 380 nm. and the ratio R1 is calculated by dividing intensity at emission maximum 360 nm. by intensity at excitation maximum 320 nm. It has been concluded from the data in Table 8 that the materials having a maximum intensity of greater than 800 would be considered fluorescent and therefore not useful in the process and product of this invention. Those materials having a maximum intensity of less than 800 have shown distinct utility and are not considered fluorescent.

TABLE 8

Total Scanning Fluorescence

| Sample/Trade Name | Dilution Factor | MAX. INT. | EXC. WAVE. | EM WAVE. | R1 |
|---|---|---|---|---|---|
| EMCOL 4500 (Emery) | 1:400 | 25 | 310 | 370 | 1.15 |
| VERSACOAT (M–I Drilling) | 1:400 | 3830 | 320 | 380 | 15.49 |
| MIRANOL CS (Rhone-Poulenc) | 1:400 | 29 | 330 | 370 | .67 |
| VERSAMUL (M–I Drilling) | 1:400 | 1730 | 310 | 380 | 0.82 |
| VERSAWET (M–I Drilling) | 1:400 | 3590 | 320 | 390 | 6.71 |
| Stearic Acid | 1:500* | 4 | 310 | 350 | 0.95 |
| Tall Oil (distilled) | 1:400 | 297 | 320 | 390 | 1.15 |
| Unhydrogenated polyalphaolefin | 1:2 | 596 | 320 | 370 | 0.62 |
| Unhydrogenated polyalphaolefin | 1:400 | 6 | 270 | 310 | 0.44 |
| UNIDYM 12 (Union Camp) | 1:500* | 478 | 270 | 300 | 0.26 |

*Sample diluted by weight with hexane.

While the invention has been described in the more limited aspects of a preferred embodiment thereof, other embodiments have been suggested and still others will occur to those skilled in the art upon the reading and understanding of the foregoing specification. It is intended that all such embodiments be included within the scope of this invention as limited only by the appended claims.

What is claimed is:

1. An oil-based drilling fluid characterized by a fluorescence intensity of 800 or less when exposed to ultraviolet light and diluted with hexane at a ratio of 1 to 400 comprising:

(a) a continuous phase comprising a synthetic hydrocarbon, said synthetic hydrocarbon being synthesized from one or more alphaolefinic monomers having a chain length of $C_2$ to $C_{14}$, said synthetic hydrocarbon having an average molecular weight of from about 120 to about 1000, said continuous phase being characterized by the absence of aromatics and conjugated double bonds; and (b) an emulsifier, said emulsifier being non-fluorescent and said emulsifier contains no conjugated double bonds or other fluorescing material.

2. The drilling fluid according to claim 1 wherein said fluid further includes water.

3. The drilling fluid according to claim 1 wherein said drilling fluid contains up to 70% water by volume.

4. The drilling fluid according to claim 1 wherein said synthetic hydrocarbon is selected from the group consisting of oligomers of: ethylene, propene, butene-1, isobutene, hexene, heptene, octene, nonene, decene, dodecene and combinations thereof.

5. The drilling fluid according to claim 1 further comprising a weight material selected from the group consisting of barite, iron oxide, calcium carbonate and combinations thereof.

6. The drilling fluid according to claim 1 wherein said emulsifier is selected from the group consisting of oleic acid, isostearic acid, sorbitan mono-oleates, saturated amido-amines and combinations thereof.

7. The drilling fluid according to claim 1 further including a wetting agent selected from the group consisting of an oxidized fatty acid or a saturated fatty acid-based imidazoline.

8. A continuous phase of an oil-based drilling fluid wherein said continuous phase is characterized by a fluorescence intensity of 800 or less when exposed to ultraviolet light and diluted with hexane at a ratio of 1 to 400, said continuous phase comprising:

(a) a synthetic hydrocarbon, said synthetic hydrocarbon being synthesized from one or more alphaolefinic monomers having a chain length of $C_2$ to $C_{14}$, said synthetic hydrocarbon having an average molecular weight of from about 120 to about 1000, said synthetic hydrocarbon being characterized by the absence of aromatics and conjugated double bonds; and (b) an emulsifier, said emulsifier being non-fluorescent and said emulsifier contains no conjugated double bonds or other fluorescing material.

9. The continuous phase according to claim 8 further including a weight material selected from the group consisting of barite, iron oxide, calcium carbonate and combinations thereof.

10. The continuous phase according to claim 8 wherein said emulsifier is selected from the group consisting of oleic acid, isostearic acid, sorbitan mono-oleate, or a saturated amido-amine.

11. The continuous phase according to claim 8 further comprising a wetting agent selected from the group consisting of an oxidized fatty acid or a saturated fatty acid-based imidazoline.

12. An oil-based drilling fluid characterized by a fluorescence intensity of 800 or less when exposed to ultraviolet light and diluted with hexane at a ratio of 1 to 400 comprising:

(a) a continuous phase comprising a synthetic hydrocarbon, said synthetic hydrocarbon being synthesized from one or more alphaolefinic monomers having a chain length of $C_2$ to $C_{14}$, said synthetic hydrocarbon having an average molecular weight of from about 120 to about 1000, said continuous phase being characterized by the absence of aromatics and conjugated double bonds; and (b) a non-fluorescing emulsifier selected from the group consisting of: non-conjugated fatty acids, monounsaturated fatty acids, saturated fatty acids, amido-amine derivatives thereof, soap derivatives thereof, and combinations thereof.

13. In an oil based drilling fluid comprising a non-fluorescent synthetic hydrocarbon as the continuous phase, and wherein said drilling fluid is characterized by a fluorescence intensity of 800 or less when exposed to ultraviolet light and diluted with hexane at a ratio of 1 to 400, the improvement comprising: a non-fluorescing emulsifier selected from the group consisting of: non-conjugated fatty acids, monounsaturated fatty acids, saturated fatty acids, amido-amine derivatives thereof, soap derivatives thereof and combinations thereof.

14. The oil-based drilling fluid of claim 13 wherein said non-fluorescent synthetic hydrocarbon contains no aromatics or other conjugated double bonds and wherein said synthetic hydrocarbon is selected from the group consisting of: polyalphaolefins, linear alphaolefins, internal olefins, and combinations thereof.

15. The drilling fluid according to claim 1 wherein said non-fluorescent emulsifier is an amido-amine derivative of a saturated fatty acid.

16. The drilling fluid according to claim 1 wherein said non-fluorescent emulsifier is the reaction product of the condensation reaction of an alkyl polyamine and a saturated fatty acid.

17. The drilling fluid according to claim 1 wherein said non-fluorescent emulsifier is the condensation reaction product of diethylenetriamine and a saturated fatty acid.

18. An oil-based drilling fluid characterized by a fluorescence intensity of 800 or less when exposed to ultraviolet light and diluted with hexane at a ratio of 1 to 400 comprising:
   (a) a continuous phase comprising a synthetic hydrocarbon, said synthetic hydrocarbon being synthesized from one or more alphaolefinic monomers having a chain length of $C_2$ to $C_{14}$, said synthetic hydrocarbon having an average molecular weight of from about 120 to about 1000, said continuous phase being characterized by the absence of aromatics and conjugated double bonds; and
   (b) an emulsifier, said emulsifier being non-fluorescent and wherein said emulsifier and base materials used to synthesize the emulsifier lack conjugated double bonds and wherein said non-fluorescent emulsifier is the condensation reaction product of diethylenetriamine and a saturated fatty acid and a saturated dicarboxylic acid.

19. An oil-based drilling fluid comprising
   a continuous phase comprising a synthetic hydrocarbon, said synthetic hydrocarbon being synthesized from one or more alphaolefinic monomers having a chain length of $C_2$ to $C_{14}$, said synthetic hydrocarbon having an average molecular weight of from about 120 to about 1000, said continuous phase being characterized by the absence of aromatics and conjugated double bonds; and
   an emulsifier, said emulsifier containing no conjugated double bonds or other fluorescing material,
   wherein said drilling fluid has a fluorescence intensity of 800 or less when exposed to ultraviolet light and diluted with hexane at a ratio of 1 to 400.

20. The drilling fluid of claim 19 wherein the emulsifier comprises an amidoamine derivative of a saturated fatty acid.

* * * * *